United States Patent [19]

Mäenpää

[11] Patent Number: 5,583,916

[45] Date of Patent: Dec. 10, 1996

[54] METHOD FOR CALL ESTABLISHMENT

[75] Inventor: Sanna Mäenpää, Espoo, Finland

[73] Assignee: Nokia Telecommunications Oy, Espoo, Finland

[21] Appl. No.: 387,925

[22] PCT Filed: Jun. 16, 1994

[86] PCT No.: PCT/FI94/00265

§ 371 Date: Feb. 23, 1995

§ 102(e) Date: Feb. 23, 1995

[87] PCT Pub. No.: WO95/01074

PCT Pub. Date: Jan. 5, 1995

[30] Foreign Application Priority Data

Jun. 23, 1993 [FI] Finland ..................... 932919

[51] Int. Cl.$^6$ ..................................... H04Q 7/38
[52] U.S. Cl. ........................ 379/58; 379/59; 455/33.1
[58] Field of Search ........................ 379/58, 59, 60; 455/33.1, 33.2

[56] References Cited

U.S. PATENT DOCUMENTS

| 5,260,987 | 11/1993 | Mauger | 379/58 |
|---|---|---|---|
| 5,400,390 | 3/1995 | Salin | 379/59 |

FOREIGN PATENT DOCUMENTS

| 0462728A2 | 12/1991 | European Pat. Off. | H04Q 7/04 |
|---|---|---|---|
| 0512962 | 11/1992 | European Pat. Off. | H04Q 7/04 |
| 92122174 | 12/1992 | WIPO . | |

OTHER PUBLICATIONS

European Telecommunication Standard 300 175 (parts numbered ETS 300–175–1 through ETS 300 175–9), Oct. 1992.
"Digital Subscriber signalling System, No. 1, (DDS 1), Network Layer User–Network Management" CCITT, vol. VI–Fascicle VI,11, Nov. 1988.
"Specifications of Signalling System No.7," CCITT, vol.VI–Fascicle VI,8.

GSM 09.02–version 3.8.0: Jan. 1991, pp. 379–382, p. 406.

ETSI, GEM 01.04/18, Version 2.00.00.

GSM 03.08–version 3.7.0: Jan. 1991, p. 18.

Primary Examiner—Curtis Kuntz
Assistant Examiner—Nay Aung Maung
Attorney, Agent, or Firm—Cushman Darby & Cushman IP Group of Pillsbury Madison & Sutro LLP

[57] ABSTRACT

The invention relates to a method for call establishment, wherein the home location register (HLR) of a cellular radio system stores information on whether a subscriber (CPP) is located within the service area of its home private branch exchange (PBX), the call to the subscriber is routed to a first mobile services switching center (GMSC), the first mobile services switching center requests (101) the home location register (HLR) to provide routing information of the subscriber, if the subscriber (CPP) is located within the service area of its home private branch exchange, the home location register sends (202) to the first mobile services switching center for comparison a roaming number having a certain correspondence with the telephone number of the subscriber, if said correspondence between the roaming number and the telephone number of the subscriber exists, the first mobile services switching center sends (203) to a second mobile services switching center (MSC) an indication of the fact that a call is to be routed to the subscriber and that the subscriber is located within the service area of its home private branch exchange (PBX), the second mobile services switching center (MSC) does not perform the mobility management functions pertaining to normal connection establishment in the system and sends (204) a connection establishment request to the private branch exchange of the home location area of the subscriber, which performs the necessary mobility management functions (215, 216, 217, 218) and establishes (119) a connection between the subscriber (CPP) and the second mobile services switching center.

12 Claims, 5 Drawing Sheets

METHOD FOR CALL ESTABLISHMENT

FIELD OF THE INVENTION

The invention relates to a method for call establishment in a cellular radio system comprising a first mobile services switching centre, a cellular radio system home location register for storing subscriber and location data on subscribers in the cellular radio system, a second mobile services switching centre and a private branch exchange connected thereto, within the service area of which subscribers are located.

BACKGROUND OF THE INVENTION

Various cellular radio systems or mobile telephone systems are in use and presently being designed in which the geographical coverage area of the system is divided into smaller separate radio areas, i.e. cells, in such a way that when the radiotelephone or mobile telephone is located in a cell, it communicates with the fixed network through a fixed radio station incorporated in the cell. The mobile telephones belonging to the system can roam freely within the system area from one cell to another. One such system is the digital mobile telephone system GSM (Global System for Mobiles).

Cordless telephone (CT) systems, such as the DECT system, have recently come out on the market. The DECT system comprises a base station, which is normally based on access to an existing fixed telephone network. There are three main types of base stations: a residential base station, a base station connected to a private branch exchange in an office, and a telepoint base station.

Cordless telephone systems can also be connected to mobile telephone networks, for instance to the GSM system. The private branch exchange (PBX) of a cordless telephone system can be connected to the GSM system for example by using DSS 1, Q.930-Q.940, 1989, Digital Subscriber Signalling System No. 1, Network Layer, User-Network Management, CCITT signalling supplemented with mobility management messages. The PBX of a cordless telephone system is connected to the switching centre of the GSM system so that the subscribers in the PBX can roam within the service area of the GSM system, and the subscribers in the PBX can make use of the mobility management procedures of the GSM system and roam within the service area of DECT systems connected to the GSM system. In such a case, mobile subscribers are attached to the PBX in accordance with the DECT radio path protocol ETS 300175, Radio Equipment and Systems (RES), Digital European Cordless Telecommunications (DECT), Common Interface, for instance. It has also been possible to connect fixed subscribers to the PBX, for example in accordance with the ISDN signalling protocol. In that event, calls originating from the GSM system or from a GSM-connected telephone network can also be routed to cordless, for instance DECT, subscribers located within the service area of the PBX.

Figure 1A:
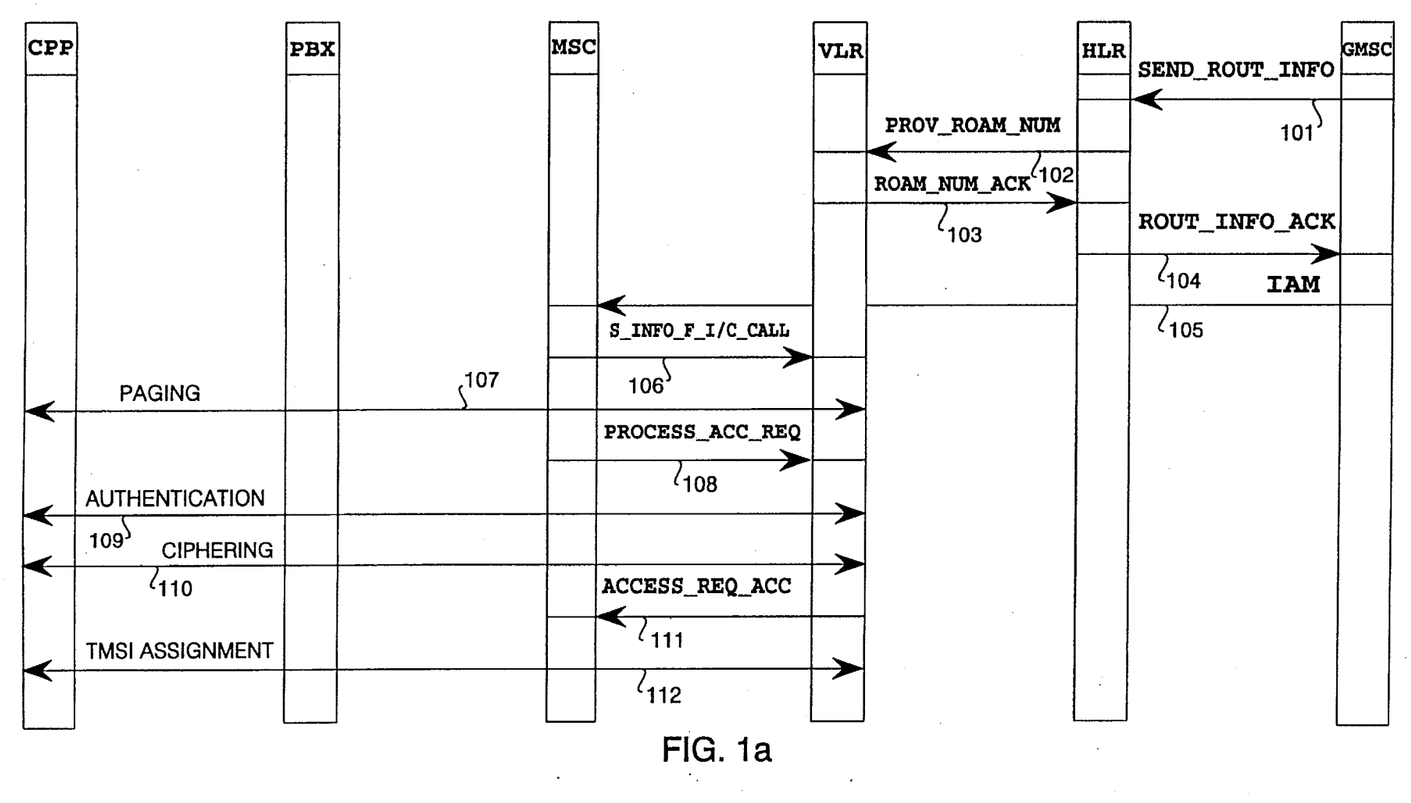
FIGS. 1a and 1b are signalling diagrams of prior art call establishment with the necessary mobility management functions.

In the prior art solution, when there is an inbound call to the PBX, register interrogation procedures in accordance with the GSM recommendations are performed, irrespective of the location of the called subscriber. FIG. 1a shows call establishment procedures in accordance with the prior art. When the call arrives at a first mobile-services switching centre, which may be a gateway mobile services switching centre (GMSC), the GMSC requests 101 routing information from the home location register (HLR) of the called

2 subscriber by sending a SEND_ROUT_INFO message. The home location register HLR checks the subscriber data from its subscriber database and sends 102 a roaming number request PROV_ROAM_NUM to the visitor location register VLR of the location area of the subscriber, and the VLR sends 103 a roaming number and routing information as an acknowledgement ROAM_NUM-ACK to the home location register HLR. The home location register HLR transmits 104 the routing information and roaming number as an acknowledgement ROUT_INFO_ACK to the gateway mobile services switching centre (GMSC), which sends 105 an indication of the subscriber, the inbound call and the roaming number in an initial address message (IAM) (specified in the common channel signalling standard Q.721-Q.766, 1989, Specifications of Signalling System No. 7, CCITT, Vol. VI—Fascicle VI.8, p. 251) to the mobile services switching centre MSC of the location area of the subscriber. Having received the IAM message, the mobile services switching centre MSC requests 106 the visitor location register VLR of the location area of the subscriber to provide routing information for the call to be routed by way of a S_INFO_F_I/C_CALL message. After having received the message or request, the visitor location register VLR performs a subscriber data check and initiates the prior art mobility management functions which form part of the normal operations for establishing a connection and are set forth in greater detail in the GSM recommendation GSM 09.02, Mobile Application Part Specification, ETSI. The first mobility management function is the paging function 107, by way of which the subscriber is located prior to call establishment. After the paging, the mobile services switching centre MSC sends 108 a resource request PROCESS_ACC_REQ to the visitor location register VLR. This is followed by authentication 109 of the subscriber. Authentication is a process wherewith the subscriber is identified as a legal user of the system. Subsequent to the authentication, ciphering 110 of the messages employed is performed. Thereafter the visitor location register VLR responds to the resource request by sending 111 an acknowledgement ACCESS_REQ_ACC. Following this, assignment 112 of the temporary mobile subscriber identity of the mobile subscriber, TMSI_ASSIGNMENT, is performed. The procedure according to this Figure is continued in FIG. 1b.

Figure 1B:
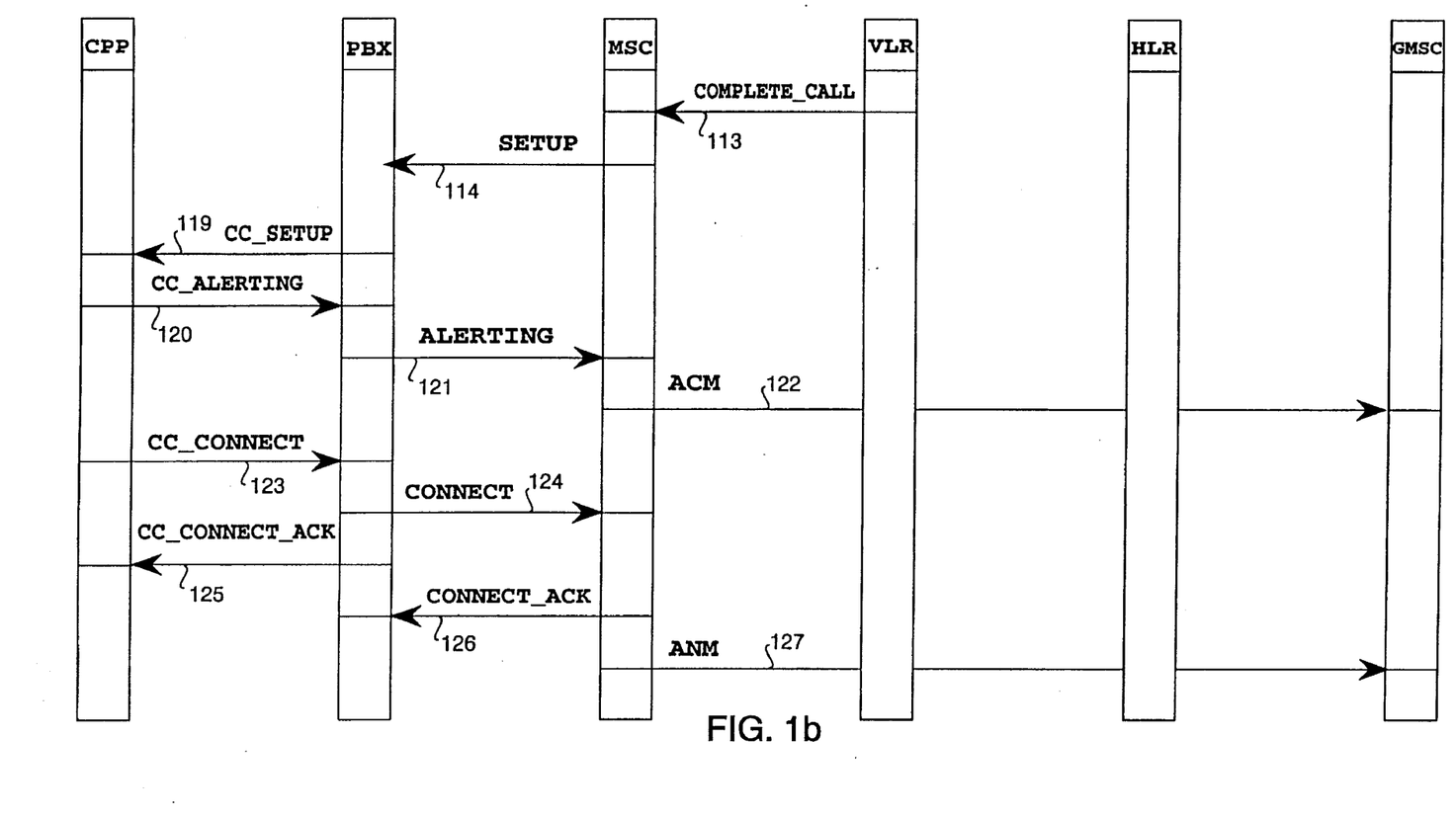

FIG. 1b is a continuation of the prior art call establishment shown in FIG. 1. When all the connection establishment functions 106, 107, 108, 109, 110, 111 and 112 shown in FIG. 1a have been performed, the visitor location register VLR sends 113 a COMPLETE_CALL message by which the visitor location register indicates that a call can be established. Only thereafter is the mobile services switching centre MSC free to establish a call to the subscriber. In that situation, the mobile services switching centre MSC sends a connection establishment request 114 as a SETUP message to the home private branch exchange PBX of the subscriber. After that, the PBX sends a connection establishment CC_SETUP message 119 to the subscriber station CPP (Cordless Portable Part), that is, to the hand-held mobile telephone attached to the PBX. It is to be noted that fixed subscribers may also access to the PBX. The subscriber station CPP responds to the CC_SETUP message by sending 120 a CC_ALERTING message to the PBX. Following this, the PBX sends 121 a corresponding ALERT message to the mobile services switching centre MSC, which sends 122 an address complete message (ACM) further to the gateway mobile services switching centre GMSC, indicating that all digits required for routing the call have been received. When a connection has been established between the subscriber station CPP and the PBX, the subscriber station CPP sends 123 a CC_CONNECT message to the PBX, and the PBX transmits 124 this message to the mobile services switching centre MSC as a CONNECT message. The PBX acknowledges the message sent to the mobile services switching centre by sending 125 a CC_CONNECT_ACK message to the subscriber station CPP. Respectively, the mobile services switching centre acknowledges the received CONNECT message by sending 126 a CONNECT_ACK acknowledgement message to the home private branch exchange PBX of the subscriber. Thereafter, the mobile services switching centre indicates that the subscriber has responded to the call by sending 127 a response message ANM to the gateway mobile services switching centre GMSC.

It is apparent from the foregoing that establishment of a connection to a subscriber located within the service area of a private branch exchange connected to a cellular radio network is a complicated and cumbersome process. It should be noted that the prior art call establishment procedure as set forth above must always be performed when a subscriber located within the service area of the private branch exchange is to be called. The mobility management functions to be performed in the GSM system which form part of the operations for connection establishment, i.e. the paging 107, subscriber authentication 109, ciphering 110, TMSI assignment 112, the S_INFO_F_I/C_CALL 106, PROCESS_ACC_REQ 108, ACCESS_REQ_ACC 111 and COMPLETE_CALL 113 messages to be sent, the roaming number request PROV_ROAM_NUM 102 placed by the home location register HLR and the response ROAM_NUM_ACK 103 provided by the visitor location register VLR, as described in the GSM 09.02 recommendation, considerably load the signalling capacity of the mobile telephone network. Heavy loading of the signalling capacity may lead to an overload and system failure, and naturally gives rise to unnecessary traffic in the network. It is further to be noted that the above connection establishment procedures and sending of the outbound messages mentioned above load the network elements that transmit such messages. The processor capacity of the network elements is unnecessarily occupied and may be overloaded. Furthermore, the network elements receiving the messages must process them and perform the desired functions which again load further network elements that receive messages.

DISCLOSURE OF THE INVENTION

It is an object of the present invention to provide a method for call establishment avoiding the above problems when a call is routed to a subscriber to his home private branch exchange. The object is to diminish unnecessary mobility management functions pertaining to connection establishment and sending of unnecessary signalling messages.

This novel method for call establishment is achieved with the method of the invention, which is characterized in that the home location register of the cellular radio system stores information on whether the subscriber is located within the service area of its home private branch exchange indicated with a home location area identifier; the call to the subscriber and the telephone number of the subscriber are routed to the first mobile services switching centre; the first mobile services switching centre requests the home location register to provide routing information of the subscriber; if the subscriber is located within the service area of its home private branch exchange, in response to the routing information request placed by the first mobile services switching centre the home location register sends to the first mobile services switching centre a roaming number containing the home location area identifier of the subscriber and having a certain correspondence with the telephone number of the subscriber; the first mobile services switching centre compares the roaming number of said subscriber with the telephone number of the subscriber and, in consequence, if said correspondence between the roaming number and the telephone number of the subscriber exists, the first mobile services switching centre sends an indication of the fact that a call is to be routed to the subscriber and that the subscriber is located within the service area of its home private branch exchange to the second mobile services switching centre, which has connection with the home private branch exchange within the service area of which the subscriber is located; in response to said indication of the subscriber being located within the service area of its home private branch exchange sent by the first mobile service switching centre, the second mobile services switching centre does not perform the mobility management functions pertaining to normal connection establishment in the system and sends a connection establishment request to the private branch exchange of the home location area of the subscriber; in response to the connection establishment request it has received the home private branch exchange of the subscriber performs the necessary mobility management functions and establishes a connection between the subscriber and the second mobile services switching centre.

The invention is based on the idea that when there is an inbound call to a subscriber located within the service area of its home private branch exchange PBX, optimized signalling wherefrom unnecessary signalling and procedural steps are omitted is employed instead of normal GSM signalling. When optimized signalling is used in a case where the subscriber is located within the service area of its home PBX, the home location register HLR responds to the routing information request placed by the gateway mobile services switching centre GMSC by sending a roaming number containing the home location area identifier of the subscriber and having a certain correspondence with the telephone number of the subscriber. Thereafter the GMSC compares the roaming number with the telephone number of the subscriber. If a certain correspondence between the numbers exists, for example such that the two or more last digits of the roaming number and the telephone number of the subscriber are the same, the GMSC sends an indication of an inbound call for the subscriber and of the fact that the subscriber is located within the service area of its home PBX to the mobile services switching centre which has connection with the home private branch exchange within the service area of which the subscriber is located. The MSC of the location area of the subscriber which receives this indication detects therefrom that it can employ optimized signalling and sends a connection establishment request directly to the home PBX of the subscriber without resorting to the cumbersome mobility management functions pertaining to connection establishment which would otherwise normally be performed.

It is an advantage of such a call establishment method that it reduces internal signalling traffic, i.e. internal messages, in the mobile telephone system. Thus the load on the telecommunication connections between the network elements of the system is reduced and their risk of overload and likelihood of congestion is diminished.

A further advantage of the invention is the fact that it reduces the load on the network components of the mobile telephone network, such as the subscriber registers, and diminishes the likelihood of congestion and risk of overload on the system.

Still another advantage of the invention is the fact that the invention expedites connection establishment when a call is placed by a subscriber in a mobile telephone network, or another telecommunications network having connection with a mobile telephone network, to a subscriber located within the service area of a PBX connected to the mobile telephone network. Connection establishment is expedited, since "unnecessary" mobility management functions are omitted from the establishment of the connection.

BRIEF DESCRIPTION OF THE DRAWINGS

The invention will now be set forth in greater detail with reference to the accompanying drawings, wherein.

DETAILED DESCRIPTION OF THE INVENTION

FIGS. 1a and 1b have been explained already in connection with the description of the prior art.

Figure 2:
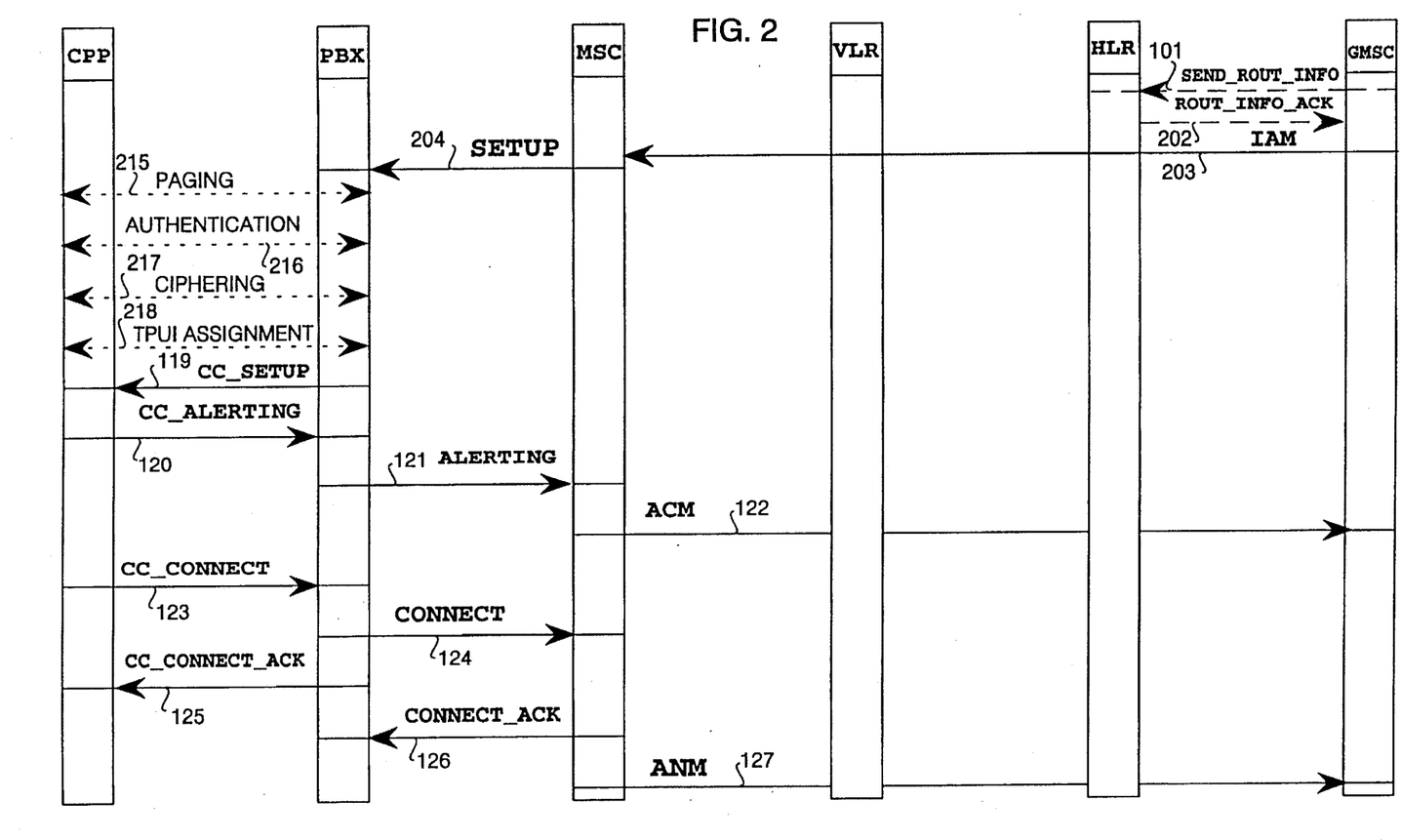
FIG. 2 is a signalling diagram of the call establishment procedure in accordance with the invention.

FIG. 2 is a signalling diagram of the call establishment procedure in accordance with the invention. When the call and the telephone number of the called subscriber arrive at a first mobile services switching centre which may be a gateway mobile services switching centre GMSC, the GMSC requests 101 the home location register HLR of the called subscriber to provide routing information by sending a SEND_ROUT_INFO message. The home location register HLR checks the subscriber data in its subscriber database, and checks the information on whether the subscriber is located within its home location area defined in the home location register. The home location area of the subscriber may be the home PBX of the subscriber or some other unit, for example the home base station of the subscriber. It is to be noted that in the method of the invention, if the called subscriber is located within its home location area, the home location register HLR does not send a roaming number request message PROV_ROAM_NUM, denoted by reference 102 in FIG. 1, to the visitor location register VLR of the location area of the subscriber. Furthermore, in the method of the invention said visitor location register VLR does not subsequently send a roaming number as acknowledgement to the home location register HLR in accordance with reference 103 in FIG. 1 representing the prior art. On the other hand, the home location register HLR sends 202 to the gateway MSC a roaming number containing the home location area identifier of the subscriber and having a certain correspondence with the telephone number of the subscriber. Such a correspondence may be e.g. the fact that the two or more last digits of the roaming number and the telephone number of the subscriber are the same. Said correspondence may naturally also be of another kind. The roaming number sent 202 may comprise routing information for routing the call to the PBX of the home location area of the subscriber. This roaming number according to the invention is sent 202 from the HLR in a ROUT_INFO_ACK message to the gateway MSC (GMSC). The GMSC compares the received roaming number with the telephone number of the subscriber. In consequence, if the correspondence set out above exists between the roaming number and the telephone number of the subscriber, the GMSC sends 203 an indication of the subscriber, the inbound call and roaming number in an initial address message IAM to the MSC of the location area of the subscriber. Naturally the use of an IAM is only one possible alternative, and hence it is possible to send said indication from the GMSC to the MSC of the location area of the subscriber in some other way as well. The initial address message IAM is described in the publication the bibliographic data of which are set forth in connection with the description of FIG. 1. The indication of the subscriber, inbound call and roaming number can be inserted into a specific field in the initial address message IAM, the user-to-user field. This field is described in greater detail in the standard Q.763, 1988, Specifications of Signalling System No. 7, CCITT Blue Book, Volume VI, Fascicle VI.8, CCITT, particularly FIG. 41/Q.763, page 245, and Q.931, 1988, Digital Subscriber Signalling System No. 1 (DSS 1), Network Layer, User-Network Management, CCITT Blue Book, Volume VI, Fascicle VI.11, particularly FIG. 4-37/Q.931, page 137, for instance.

The MSC of the location area of the subscriber receives the indication of the fact that the subscriber is located within the service area of its home PBX, which was sent by the GMSC in the IAM message. Thereafter, since the indication of the subscriber being located within the service area of its home PBX has arrived at the MSC, the mobile telephone network does not perform the mobility management functions pertaining to normal connection establishment in the GSM system, which are more closely described in connection with the description of FIG. 1 representing the prior art. These omitted "unnecessary" signalling messages and mobile applications part (MAP) messages, each of which may comprise several messages and which together constitute the mobility management functions, are depicted by reference numerals 106, 107, 108, 109, 110, 111, 112 and 113 in connection with the description of FIG. 1. Thus also the prior "unnecessary" register interrogation, paging and other functions performed by the network elements that participate in the sending and reception of these messages are omitted, and the operation of the system is made faster, simpler and lighter. In accordance with the invention, the mobile services switching centre MSC of the location area of the subscriber sends a connection establishment request 204 to the home PBX of the subscriber directly after reception of the initial address message (IAM) 105. The connection establishment request corresponds to the SETUP connection establishment request indicated by reference numeral 114 in FIG. 1. A mobile services switching centre MSC operating in accordance with the inventive method is capable of handling a connection establishment request arriving in such a new and unexpected situation, since the mobile services switching centre is provided with a handling mechanism and suitable handling means for such a message, implemented for instance in software. As the next step, the home PBX of the subscriber starts performing the mobility management functions pertaining to connection establishment in the service area of the PBX. The PBX may either perform all of the mobility management functions set out hereinbelow, perform only part of them or omit them. The first function pertaining to mobility management is the paging function 215, whereby the subscriber within the service area of the PBX is located. Thereafter the PBX performs the authentication 216 of the subscriber within the service area of the PBX. Subsequent to this step, the PBX activates ciphering 217 of the messages employed on the radio route. This is followed by assignment 218 of the temporary user identification, TPUI_ASSIGNMENT (the temporary subscriber identity TPUI corresponds to the TMSI in the GSM). The TPUI may be the same as, or different from, the GSM TMSI. If the subscriber in the PBX is a DECT subscriber, the mobility management functions, i.e. the paging, authentication, ciphering and TPUI assignment, are performed in accordance with the DECT standard European Telecommunication Standard ETS 300 175-5: Radio Equipment and Systems. Digital European Cordless Telecommunications Common Interface, Part 5: Network layer. Thereafter the call establishment is continued as normal prior art call establishment in accordance with FIG. 1b in such a way that the message sending functions denoted by reference numerals 119, 120, 121, 122, 123, 124, 125, 126 and 127 and the consequent functions executed by the network elements are performed in accordance with the prior art.

Figure 3:
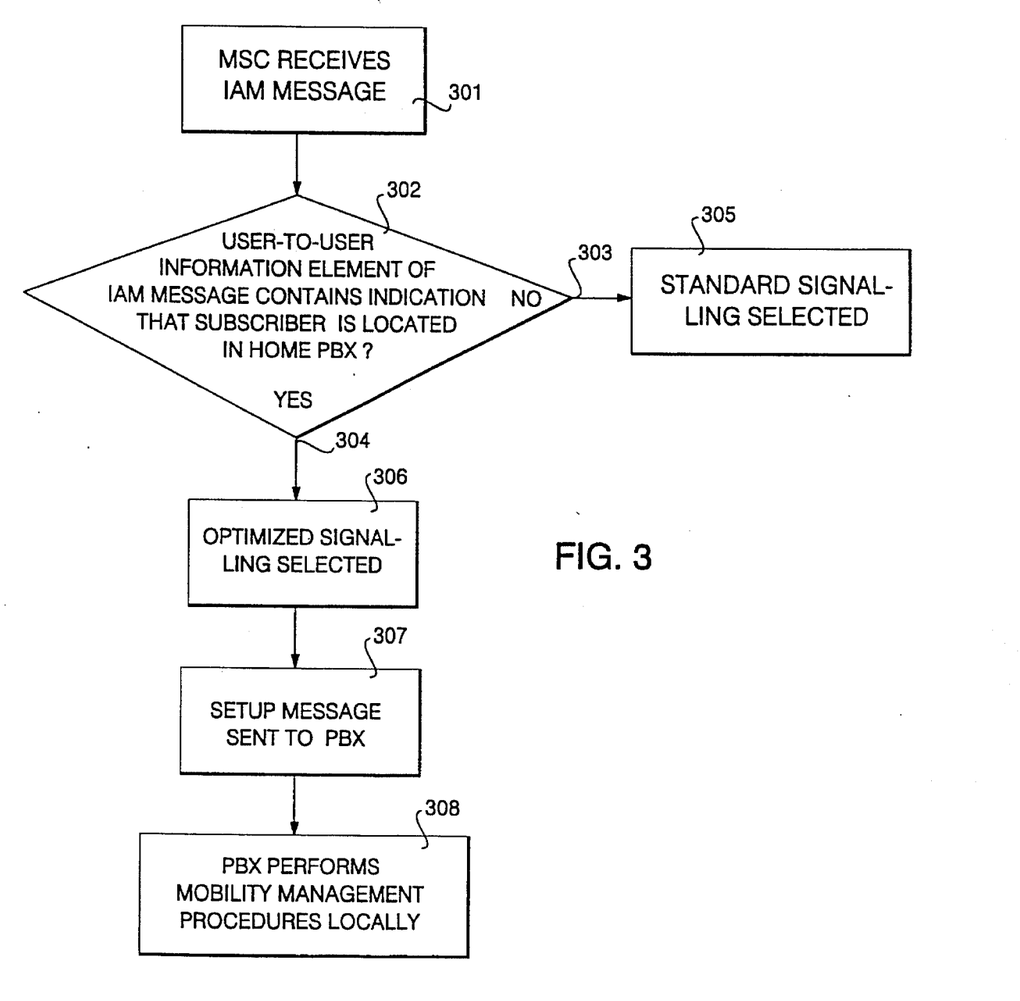
FIG. 3 is a flow chart of a decision made by the mobile services switching centre by which the mobile services switching centre opts for performing call establishment in accordance with the present invention.

FIG. 3 is a flow chart of a decision made by the mobile services switching centre by which the mobile services switching centre opts for performing call establishment in accordance with the present invention. At 301, the MSC receives an initial address message IAM and at 302 analyzes said IAM message, i.e. checks whether it contains an indication of the fact that the subscriber is located within its home location area, i.e. in its home PBX. If the message contains no such indication 305, the MSC opts for normal prior art call establishment. If, on the other hand, the initial address message IAM contains 304 an indication of the fact that the subscriber is located within the service area of its home PBX, the MSC opts for optimized signalling 306 to establish a call. In consequence, the MSC sends 307 a connection establishment message, i.e. a SETUP message, to the home PBX of the subscriber, which performs 307 the call establishment and the necessary mobility management procedures locally between said PBX and subscriber stations located within its service area.

Figure 4:
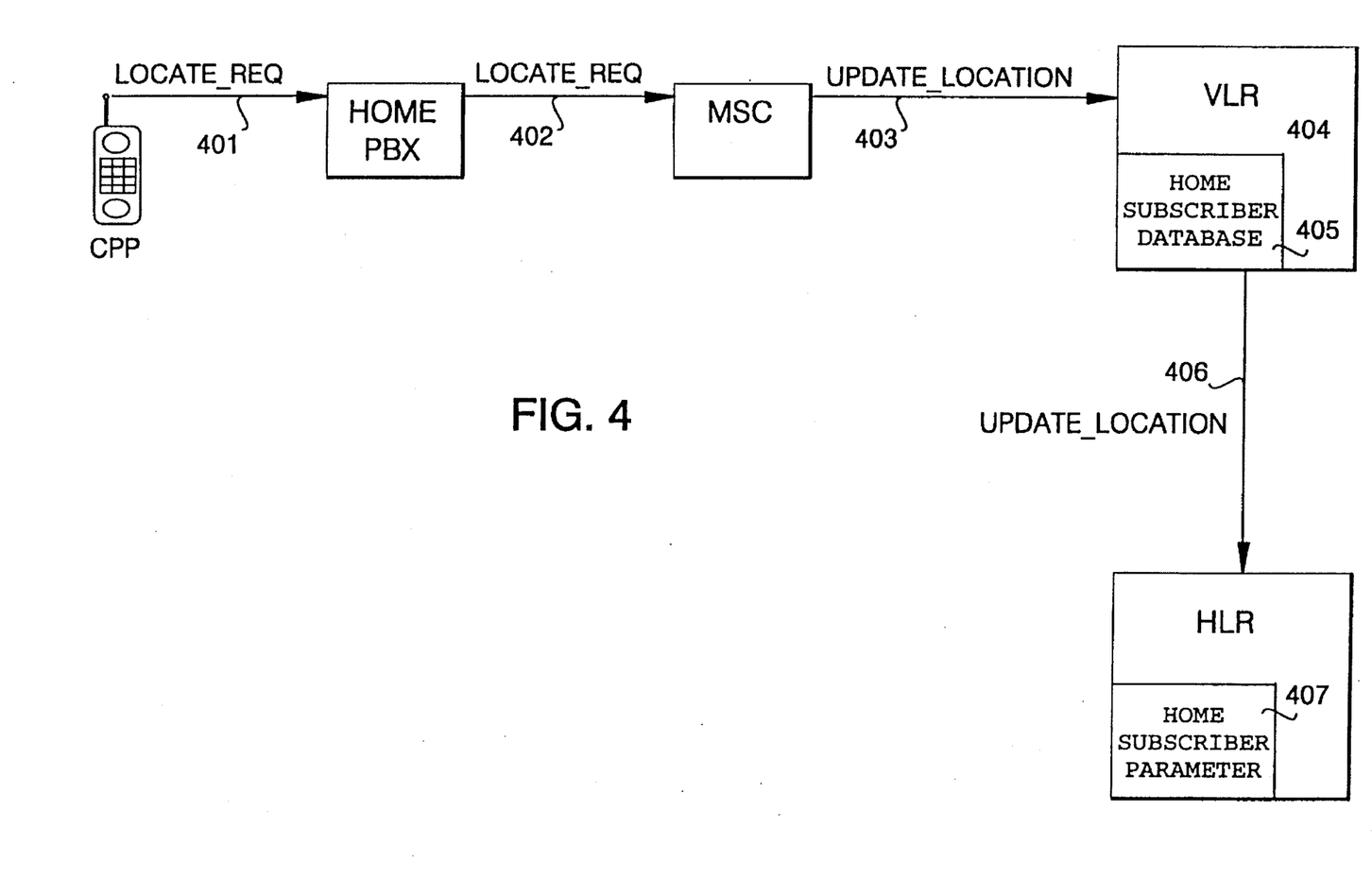
FIG. 4 is a functions diagram of the updating of the home location area identity of a subscriber in different subscriber registers in a mobile telephone network.

FIG. 4 is a functions diagram of the updating of the home location area identity of a subscriber in different subscriber registers in a mobile telephone network. In implementing the method of the invention, only those subscribers in the PBX need to be indicated as subscribers of the home PBX in the registers of the mobile telephone network that also roam outside the service area of the home PBX. This is necessary because if the subscriber is always located within the service area of the home PBX, for example if it is a fixed subscriber, the default value can automatically be set at said subscriber being located specifically within the service area of its own PBX. The subscriber is indicated as a subscriber of the home PBX by way of subscriber identity (IMSI= international mobile subscriber identity) and location area identity. In the invention, a home subscriber database 405 is provided in the visitor location register VLR connected to the home PBX, consisting of the identifiers of those subscribers which have a given PBX located within the service area of said VLR as their home location area. Thus one PBX constitutes one home location area. Such a novel home subscriber database 405 contains the identifier of said PBX, i.e. the identifier of the corresponding home location area, and the IMSI of the subscriber concerned. The home subscriber database 405 also stores a flag, for example one bit, indicating whether the subscriber is located within the area of its home PBX or not. The home subscriber database may be for instance as outlined in the GSM recommendation TS GSM 03.08, 1992, Organisation of Subscriber Data, ETSI, particularly Table 1, page 18, but adapted in such a manner that the inventive data are included therein. A corresponding home subscriber database 407 is included in the subscriber home location register HLR according to the invention. When necessary, the home location area identifier can be updated as a new identifier in the subscriber home location register and the visitor location register of the home location area of the subscriber.

When the subscriber CPP arrives in its home PBX and updates 401 its location by requesting location updating, sending a LOCATE_REQ message to the PBX, the PBX transmits 402 the location updating request to the mobile services switching centre MSC of the location area of the subscriber. The mobile services switching centre MSC transmits 403 the location updating request to the visitor location register VLR of the location area by sending an UPDATE_ LOCATION message comprising the subscriber IMSI and the identifier of the home PBX of the subscriber. The visitor location register checks 404 in the subscriber home PBX-specific home subscriber database 405 whether the identifier of said subscriber is found in the home subscriber database. If the identifier of the subscriber is found in the home subscriber database, the visitor location register VLR transmits 406 an indication of the subscriber being located within its home location area to the home location register HLR of the subscriber by sending an UPDATE_LOCATION message. This message contains the roaming number of the subscriber, i.e. the subscriber MSRN number, which is of such a format as to enable inferring that the subscriber is located within its home location area, that is, within the service area of its home PBX. In this case, the home location register HLR updates in its home location database an indication of the fact that the subscriber is located within its home location area.

The drawings and the description pertaining thereto are only intended to illustrate the inventive concept. The call establishment method according to the invention may vary in its details within the scope of the claims. Even though the invention has been set forth in the above mainly in the context of the GSM system, the invention may be used in other kinds of mobile telephone systems as well.

I claim:

1. A method for call establishment in a cellular radio system comprising a first mobile services switching centre a cellular radio system home location register for storing subscriber and location data on subscribers in the cellular radio system, and a second mobile services switching centre, the method comprising the following steps:

a private branch exchange connected to the second mobile services switching centre is provided, subscribers being located within the service area of said private branch exchange;

the home location register of the cellular radio system stores information on whether the subscriber is located within the service area of its home private branch exchange indicated with a home location area identifier;

the call to the subscriber and the telephone number of the subscriber are routed to the first mobile services switching centre;

the first mobile services switching centre requests the home location register to provide routing information of the subscriber;

if the subscriber is located within the service area of its home private branch exchange, in response to the routing information request placed by the first mobile services switching centre the home location register sends to the first mobile services switching centre a roaming number containing the home location area identifier of the subscriber and having a certain correspondence with the telephone number of the subscriber;

the first mobile services switching centre compares the roaming number of said subscriber with the telephone number of the subscriber and, in consequence, if said correspondence between the roaming number and the telephone number of the subscriber exists, the first mobile services switching centre sends an indication of the fact that said call is to be routed to the subscriber and that the subscriber is located within the service area of its home private branch exchange to the second mobile services switching centre, which has connection with the home private branch exchange within the service area of which the subscriber is located;

in response to said indication of the subscriber being located within the service area of its home private branch exchange sent by the first mobile service switching centre, the second mobile services switching centre does not perform the mobility management functions pertaining to normal connection establishment in the system and sends a connection establishment request to the private branch exchange of the home location area of the subscriber;

in response to the connection establishment request it has received the home private branch exchange of the subscriber performs the necessary mobility management functions and establishes a connection between the subscriber and the second mobile services switching centre.

2. A method for call establishment as claimed in claim 1, wherein said correspondence between the roaming number and the telephone number of the subscriber is such that the two or more last digits of the roaming number and the telephone number of the subscriber are the same.

3. A method for call establishment as claimed in claim 1, wherein in connection with the location updating of subscribers, an indication of the fact that a subscriber is located within the service area of its home PBX is transmitted to the home location register.

4. A method for call establishment as claimed in claim 2, wherein in connection with the location updating of subscribers, an indication of the fact that a subscriber is located within the service area of its home PBX is transmitted to the home location register.

5. A method for call establishment as claimed in claim 1, wherein a home subscriber database is provided for each home private branch exchange in the visitor location register connected to said second mobile services switching centre, consisting of the identifiers of those subscribers which have said home private branch exchange as their home location area.

6. A method for call establishment as claimed in claim 2, wherein a home subscriber database is provided for each home private branch exchange in the visitor location register connected to said second mobile services switching centre, consisting of the identifiers of those subscribers which have said home private branch exchange as their home location area.

7. A method for call establishment as claimed in claim 3, wherein a home subscriber database is provided for each home private branch exchange in the visitor location register connected to said second mobile services switching centre, consisting of the identifiers of those subscribers which have said home private branch exchange as their home location area.

8. A method for call establishment as claimed in claim 5, wherein when the subscriber arrives in its home private branch exchange and updates its location, the visitor location register of the location area of the subscriber checks in the subscriber home PBX-specific home subscriber database whether the identifier of said subscriber is found in the home subscriber database, and if the identifier of the subscriber is found in the home subscriber database, the visitor location register transmits an indication of the subscriber being located within its home location area to the home location register of the subscriber.

9. A method for call establishment as claimed in claim 1, wherein the home location area identifier of the subscriber is updated when necessary in the subscriber home location register and the visitor location register of the home location area of the subscriber.

10. A method for call establishment as claimed in claim 1, wherein the roaming number sent by said home location register to the first mobile service switching centre comprises routing information for routing the call to the subscriber.

11. A method for call establishment as claimed in claim 1, wherein the indication of the fact that the subscriber is located within the service area of its home private branch exchange is sent from the first mobile services switching centre to the second mobile services switching centre in an initial address message.

12. A method for call establishment as claimed in claim 11, wherein the indication of the fact that the subscriber is located within the service area of its home private branch exchange is sent from the first mobile services switching centre to the second mobile services switching centre in the user-to-user field of the initial address message.

* * * * *